April 29, 1952 R. H. GODDARD 2,594,765
RESONANCE COMBUSTION APPARATUS
Filed Oct. 6, 1945 4 Sheets-Sheet 1
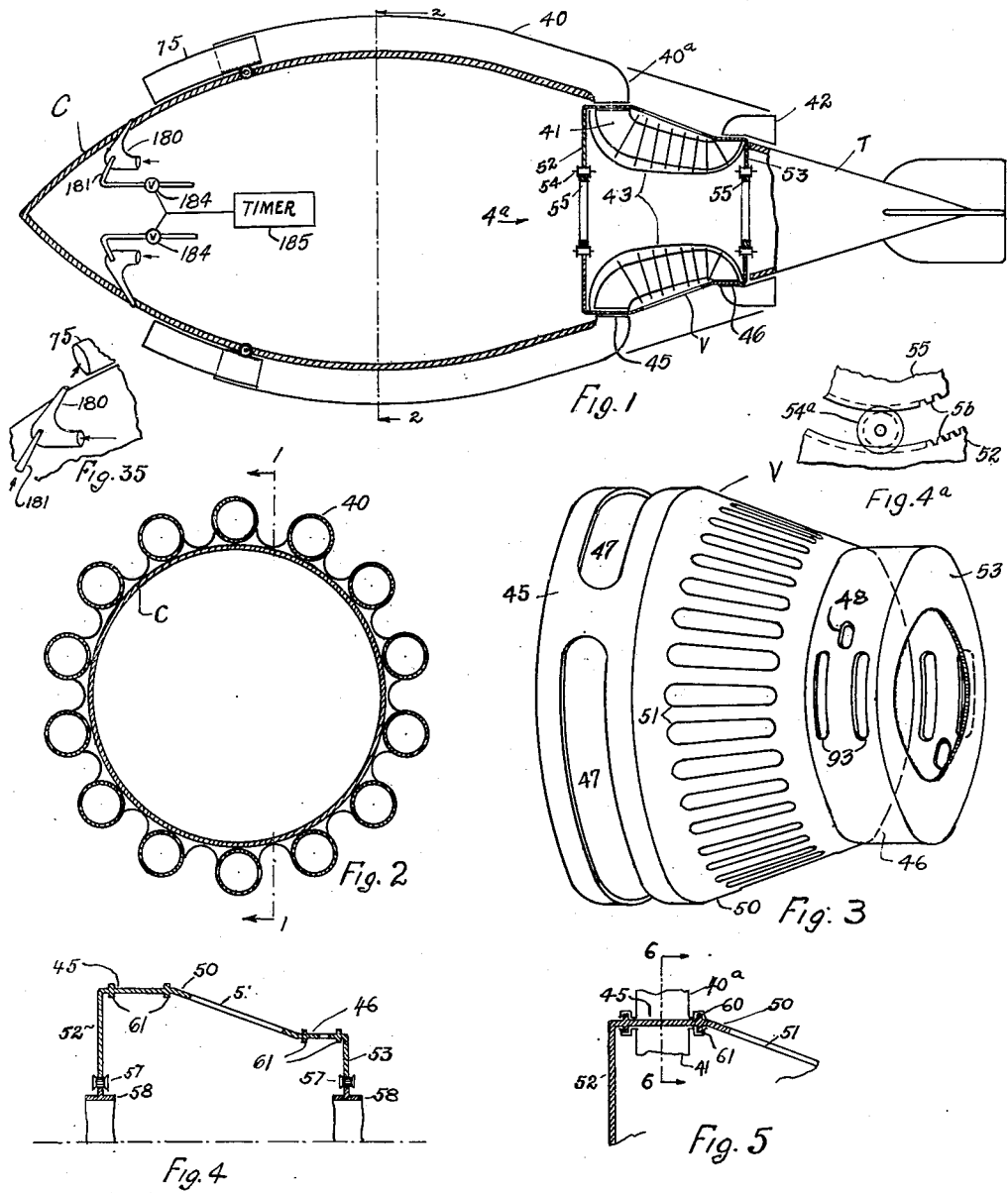
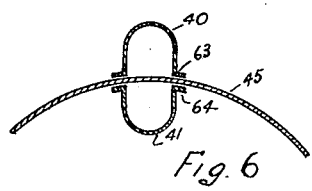
INVENTOR.
ROBERT H. GODDARD, DECEASED
BY ESTHER C. GODDARD, EXECUTRIX
BY
Chas. T. Hawley
ATTY.

April 29, 1952 R. H. GODDARD 2,594,765
RESONANCE COMBUSTION APPARATUS
Filed Oct. 6, 1945 4 Sheets-Sheet 2
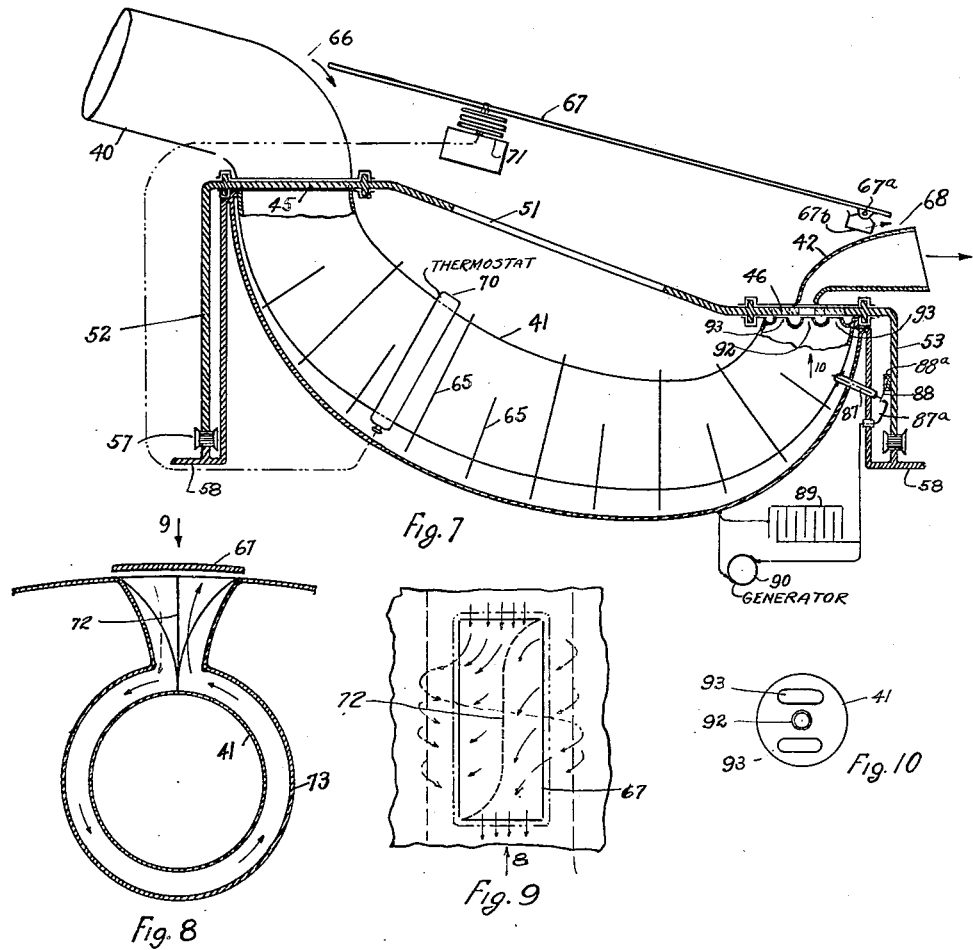
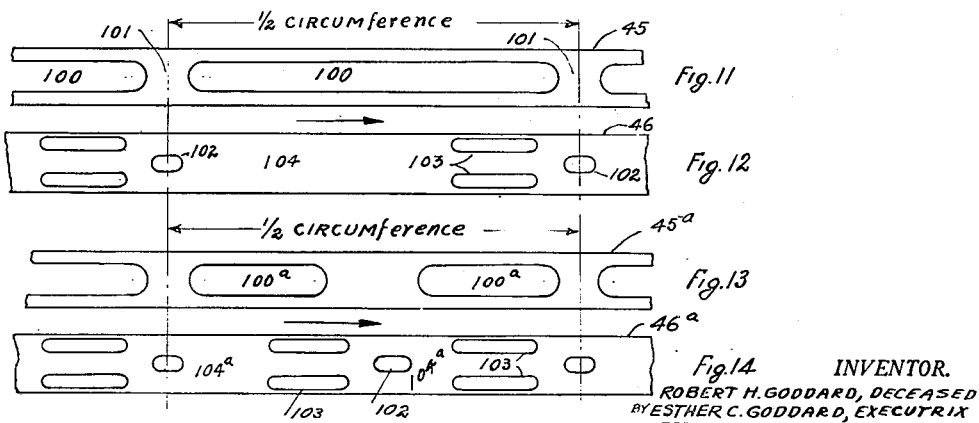
INVENTOR.
ROBERT H. GODDARD, DECEASED
BY ESTHER C. GODDARD, EXECUTRIX
BY
Chas. T. Hawley
ATT'Y.

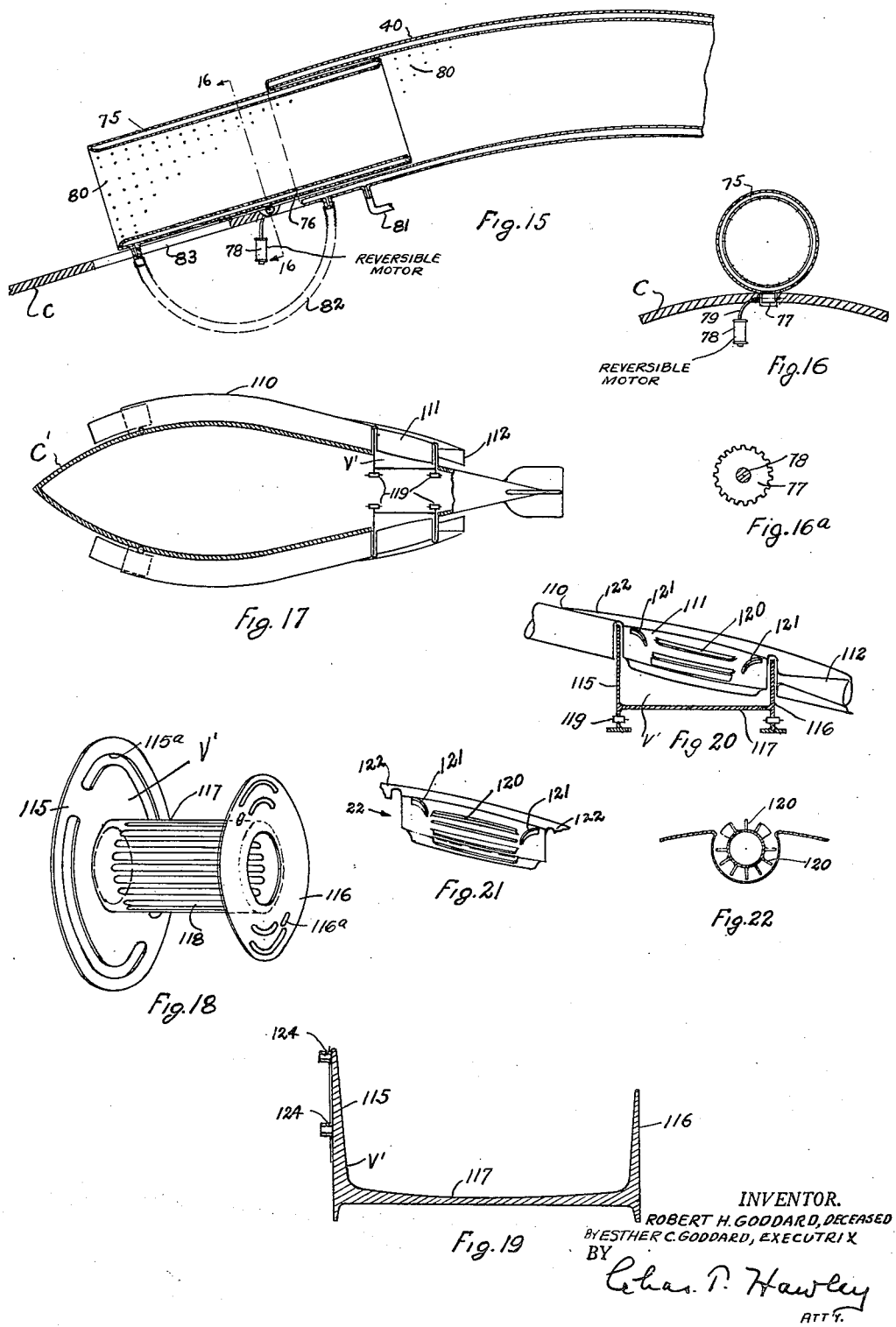

April 29, 1952 R. H. GODDARD 2,594,765
RESONANCE COMBUSTION APPARATUS
Filed Oct. 6, 1945 4 Sheets-Sheet 4

INVENTOR.
ROBERT H. GODDARD, DECEASED
BY ESTHER C. GODDARD, EXECUTRIX
BY
Chas. T. Hawley
ATT'Y.

Patented Apr. 29, 1952

2,594,765

UNITED STATES PATENT OFFICE 2,594,765

RESONANCE COMBUSTION APPARATUS

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application October 6, 1945, Serial No. 620,826

4 Claims. (Cl. 60—35.6)

This invention relates to combustion apparatus operating on the "resonance" principle and of the general type shown and described in the prior United States Patent No. 1,980,266, issued to Robert H. Goddard, November 13, 1934.

In such apparatus, the operation of each propulsion unit is intermittent, and advantage is taken of the resonant or surging effect in a relatively long tube or collector for compressing the successive mixed air and fuel charges before ignition.

It is the general object of the present invention to provide an improved and more effective combustion apparatus of the resonance type. To the attainment of this general object, new and improved valve means have been provided to control fuel admission, combustion gas discharge, and rinsing of the combustion chamber. There are also provided clear and unobstructed entrance and outlet passages for the combustion chamber when the inlet and outlet valves are open.

A further object of the invention is to provide control valves so constructed that the end thrusts acting thereon are balanced and neutralized.

Means is also provided for conveniently controlling the aircraft speed by varying the resonance frequency and the firing timing.

Other features of the invention relate to the provision of means to control the combustion chamber temperature, and to means to neutralize centrifugal thrust.

The invention further relates to arrangements and combinations of parts which will be hereinafter described and more particularly pointed out in the appended claims.

Preferred forms of the invention are shown in the drawings, in which

Fig. 1 is a sectional side elevation of an aircraft embodying the invention, taken substantially along the line 1—1 in Fig. 2;

Fig. 2 is a cross section of the craft on the line 2—2 in Fig. 1;

Fig. 3 is a perspective view of a rotating valve member;

Fig. 4 is a partial longitudinal section of said valve member;

Fig. 4a is a detail partial side elevation, looking in the direction of the arrow 4a in Fig. 1.

Fig. 5 is an enlarged detail section of a part of said valve member;

Fig. 6 is a detail section on the line 6—6 in Fig. 5;

Fig. 7 is an enlarged side elevation, partly in section, of one of the combustion chambers;

Fig. 8 is an end view, partly in section, of an air-cooling device, looking in the direction of the arrow 8 in Fig. 9;

Fig. 9 is a plan view of the air-cooling device, looking in the direction of the arrow 9 in Fig. 8;

Fig. 10 is a plan view of a port arrangement, looking in the direction of the arrow 10 in Fig. 7;

Figs. 11, 12, 13 and 14 are valve member developments, to be described;

Fig. 15 is a partial longitudinal section of a collector;

Fig. 16 is a transverse section, taken along the line 16—16 in Fig. 15;

Fig. 16a is a detail end view of a pinion gear to be described;

Fig. 17 is a view similar to Fig. 1 but showing a modified construction;

Fig. 18 is a perspective view of a rotary valve member;

Fig. 19 is a partial enlarged longitudinal section of the valve member;

Fig. 20 is an enlarged side elevation of certain parts shown in Fig. 17, with the rotary valve member shown in partial section;

Fig. 21 is a side elevation of a combustion chamber;

Fig. 22 is an end view, looking in the direction of the arrow 22 in Fig. 21;

Fig. 35 (sheet 1) is a detail view of a starting device.

Figure 23:
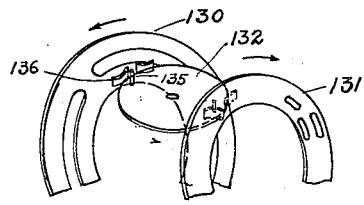
Fig. 23 is a perspective view of a modified valve construction.

It is well known that a properly designed duct passing rapidly through the air and in which combustion is maintained tends to move forward into the air stream, such a device being known as a ram jet or "athodyd." The efficiency of such a device is not high except at extreme speeds, as the compression and temperature are relatively low.

In the case of resonance collectors, chambers and nozzles, such as are described in the United States Patent No. 1,980,266, the temperature and pressure is periodically high in the combustion chamber, due to the maxima accompanying adiabatic compression. These periodic maximum values are much higher than the more uniform and continuous pressure and temperature obtainable in the athodyd. For this reason, the present structure is superior to the athodyd at moderate speeds, as the pressure and temperature at the instant of firing, although momentary, are nevertheless as high as those which the athodyd attains only at much greater speeds.

Resonance oscillations occur essentially as the fundamental or harmonic of the resonance tube or collector which opens into the combustion chamber, the latter opening into a nozzle at its rear end. The mixture of air and fuel is fired when it is most strongly compressed within the chamber, the mass of air involved being a small fraction of the whole amount in the collector so that the oscillations within the collector are not seriously interfered with.

For high propulsive effectiveness, the speed of the ejected gases should be moderate and the mass large. This large mass is made possible in the present invention because a large amount of air is gathered by each collector and is heated to a high temperature by adiabatic compression at the moment of firing, when the compression due to surging is high.

Referring to Figs. 1 and 2, an aircraft C is shown having a plurality of propulsion units assembled about its periphery. These units are preferably mounted in diametrically spaced pairs, with any desired number of units uniformly spaced circumferentially.

Each propulsion unit comprises an air collector 40, a combustion chamber 41, and a rearwardly-directed discharge nozzle 42. The combustion chambers are preferably mounted in casing portions 43 recessed within the aircraft fuselage.

Admission and discharge valves for the combustion chambers are provided for the assembled propulsion units and are located respectively at the forward and rearward ends of the combustion chambers 41.

A preferred form of rotary valve member V is shown in perspective in Fig. 3, and in partial section in Figs. 4 to 6. The valve member V comprises two cylindrical bands 45 and 46. In the forward band 45 are located admission slots 47 for the combustion chambers, and in the rearward band 46 discharge slots 48 are provided, opening into the nozzles 42. These cylindrical parts 45 and 46 of the valve member V are connected by a conical sleeve 50, perforated or slotted for lightness at 51. The valve member V is provided with forward and rearward end discs or flanges 52 and 53 (Fig. 4) extending radially inward, which flanges are engaged by gear wheels or rollers 54 having axes fixed with respect to the fuselage.

The net angular momentum of the valve member V may be reduced to practically zero by providing rings 55 (Fig. 1) which rotate oppositely to the valve V and cancel the angular momentum of the valve member. The inner and rolling edges of the flanges 52 and 53 are provided with gear teeth 56 engaging pinions 56a as shown in Fig. 4a or with substantially non-slipping friction surfaces.

The bands 45 and 46 of the valve member V are made cylindrical, so that when chambers on opposite sides of the craft are fired at the same time the resultant radial as well as axial forces on the valve member V will be neutralized.

An alternative means for supporting the valve member V is indicated in Fig. 4, in which rollers 57 are provided between the flanges 52 and 53 and fixed circular tracks 58. This plan avoids the rotating weight of the rings 55 (Fig. 1) but does not neutralize the angular momentum of the valve member and hence does not eliminate gyroscopic forces.

In order to permit the use of the cylindrical valve bands 45 and 46, the rearward end of each collector 40 is curved inward at 40a (Fig. 1) so as to approach the chamber 41 radially, and the rearward end 41a of the chamber 41 is similarly curved outward where it approaches the nozzle 42. The nozzle is made as short and as wide as possible, in order to avoid over-expansion. Further, the inner surfaces of each collector 40, chamber 41 and nozzle 42 are all made very smooth, to reduce both the resistance to flow and the likelihood of having harmonics occur.

The entrance and exit passages of the combustion chamber 40 contain no obstruction whatever when the valve ports are open, but are closable quickly and entirely by the valve bands. Valve leakage when closed is reduced as much as possible by the use of band surfaces extending axially beyond the chamber entrance and exit openings.

As shown in Fig. 5, which is an enlargement of a portion of Fig. 4, fore-and-aft leakage may be reduced by providing outside flanges 60 and inside flanges 61 at both edges of the valve bands 45 and 46. These flanges on the valve bands travel in corresponding slots in the collector and chamber walls. As shown in the fragmentary section (Fig. 6), the cylindrical band 45 also travels with close clearance relative to flanges 63 and 64 on the rear ends of the collectors 40 and on the entrance ends of the combustion chambers 41. Similar flanges are provided for the band 46 at the discharge end of each chamber.

The chamber 41, which is the hottest part of the entire system, is cooled by air flow on outside flanges 65 (Fig. 7). The air enters through an opening 66 between each collector 40 and a plate 67 which is hinged at 67a to a support 67b. This plate 67 also serves to reduce air resistance by bridging the inwardly displaced chamber. The air leaves through an opening 68 at the rear end of the plate 67. The extent of the forward opening 66 is controlled by a liquid-filled thermostat 70 surrounding the chamber 41 and connected to a bellows 71 operative on the pivoted plate 67. As the temperature increases, the bellows 71 is expanded and increases the opening 66.

The air enters over the full width of the opening 66, and leaves over the full width of the opening 68. It is forced by the partition 72 (Figs. 8 and 9) to flow down along one side of the chamber 41 and to flow up the other side and out through the opening 68. A casing portion 73 (Fig. 8) holds the air in contact with each chamber 41.

Each collector 40, which is the duct in which most of the resonance oscillations take place, may be tuned by varying its effective length. For this purpose, a sleeve 75 (Figs. 1 and 15) at the forward end of the collector 40 is movable forwardly or rearwardly by a rack 76 on the collector and a pinion gear 77 (Figs. 16 and 16a) having a fixed axis and rotated by a reversible motor 78. The motor 78 may be connected to the gear 77 by a flexible shaft 79 (Fig. 16), in order that the motor may be located conveniently within the aircraft C.

As each valve member V normally cuts off all communication between its chamber 41 and collector 40, fuel may be introduced along the entire length of the collector 40 and even in the entrance sleeve 75. In Figs. 15 and 16 both the entrance sleeve 75 and the collector 40 are shown hollow, with orifices 80 provided in the inner wall of each. The collector 40 is supplied with liquid fuel through a pipe 81 and is in turn connected to the sleeve 75 through a flexible tube 82. This tube 82 moves in a slot 83 (Fig. 15) when the sleeve 75 is adjusted.

This method of fuel introduction has important advantages. There are no fuel injection members extending across the collector to introduce air resistance. Many fine orifices 80 can be used, thus introducing fine fuel streams throughout the entire space inside the collector and sleeve. Further, since most of the fuel is introduced into the air stream a considerable distance forward of the combustion chamber, the drops will have a comparatively long time to evaporate, and the mixture will become homogeneous through the action of eddies.

Figure 34:
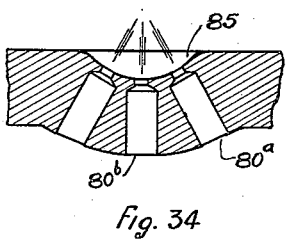
Fig. 34 is a view similar to Fig. 32 but showing a modified construction.
Figure 32:
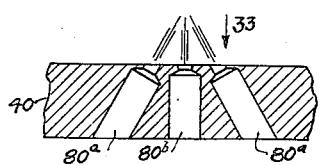
Fig. 32 is a sectional detail showing a preferred construction of fuel inlet orifices.
Figure 33:
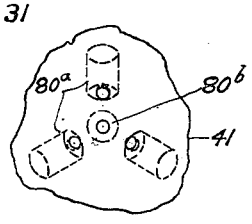
Fig. 33 is a plan view, looking in the direction of the arrow 33 in Fig. 32.

Preferred constructions for the orifices 80 are shown in Figs. 32, 33 and 34. These orifices consist of groups of three or more holes 80$^a$ formed in the metal walls of the collector and sleeve and so inclined that they come to a focus, together with a central hole 80$^b$ directed to the same point.

The holes 80$^a$ produce a spray, and the central hole 80$^b$ prevents the spray from extending backward toward and adhering to the collector or sleeve containing the holes. The diameter of the holes is preferably large except at the outlets, in order to reduce friction.

In the construction shown in Fig. 34, the holes 80$^a$ and 80$^b$ are located in a dent or depression 85 in the metal wall. This has the advantage that friction through the small delivery outlets is reduced by the narrow orifice edges. The irregularities produced in the metal sheet is a disadvantage, however, as they produce considerable air resistance at extremely high speed.

With either orifice arrangement either a wide or a narrow cone of spray can be produced, so that fuel can be mixed thoroughly with an air stream near the metal surface in which the holes are located, or at a considerable distance from this surface.

The charge in each combustion chamber 41 is fired by a spark-plug 87 (Fig. 7) when a metal plate 88 bridges a gap between the outer end of the spark-plug 87 and a terminal at the end of a conductor 87$^a$ extending to a condenser 89, continuously charged by a high-voltage generator 90. This method is used in order to have the spark take place within a very short time interval. The plate 88 is mounted on an insulating block 88$^a$ on the flange 53 of the rotating valve member V and produces the spark at the time when the entrance opening of the chamber 40 is closed by the valve band 45.

Since the passage between each collector and chamber should remain open except just at the instant of firing, the valve band 45 should be slotted and open except at widely spaced intervals. Chambers that are fired in pairs should be diametrically opposite relative to the aircraft axis to balance the forces on the valve member.

In order to obtain high firing frequency, a number of these pairs may be located at closely spaced intervals. The frequency of the firing of a chamber will then be equal to the R. P. M. of the valve member times twice the number of pairs of blank spots along the valve band 45.

The use of several opposite pairs of combustion chambers is of advantage in making possible a high frequency of firing with relatively low speed of rotation of the valve members and with little difficulty from centrifugal force. It is also desirable that the chambers thus fired in successive pairs should be large in number and relatively small in size, in order to reduce jar and stress on the craft as firing takes place and also to reduce noise.

To prevent interference with the passage of the high velocity gases, the entrance edge of each nozzle is flared outward as shown in Fig. 7 and is somewhat wider than the rear end or exit opening 92 of the associated combustion chamber. This prevents the gases from the exit opening striking the edge of the nozzle 42.

After the chamber pressure has dropped to a low point by the passage of the burned gases through the nozzle, rinsing slots 93 (Figs. 7 and 10) in the chamber and located alongside the outlet 92 to the nozzle are opened by the valve member V at the same time that the chamber entrance orifice is opened. The pressure of the entering air, plus any pressure still existing in the collector then forces out the remainder of the burned gases to the atmosphere, thus rinsing the chamber. These slots 93 remain open during the return or forward motion of the air.

When the air flow reverses and begins to be rearward, the nozzle orifice 92 and the slots 93 are closed, and the fuel-charged air from the collector enters the chamber and is compressed. When the pressure reaches the maximum, the entrance orifice of the chamber is closed, the nozzle orifice 92 is opened, and the charge is fired.

A development of the valve bands 45 and 46 is shown in Figs. 11 and 12. The entrance band 45 has long intake slots 100 and intervening blanks or shut-off portions 101. The discharge or exit band 46 has a discharge port 102 and rinsing ports 103 and a long intervening blank or shut-off portion 104. For a single opposite pair of diametrically opposite chambers, the entrance end of each combustion chamber is closed twice for each rotation, the discharge opening 92 is closed twice, and the rinsing slots 93 remain open long enough after each firing to produce the rarefaction part of the cycle of the oscillation in the collector 40.

For four chambers arranged in diametrically opposite pairs, the intake slots 100$^a$ in the entrance band 45$^a$ are reduced in length and increased in number as shown in Fig. 13, and the blanks or shut-off portions 104-$a$ in the discharge band 46$^a$ are shortened as shown in Fig. 14. This provides for charging and firing four chambers in diametrically opposite pairs and substantially simultaneously.

In order to minimize jar on the aircraft, it is desirable that not more than a single pair of diametrically opposite propulsion chambers should be fired at exactly the same time. When the propulsion chambers are equally spaced circumferentially and when more than a single pair of diametrically opposite chambers are to be fired at each revolution of the valve member, the circumferential spacing of the intake slots 100ᵃ in the entrance band 45ᵃ (Fig. 13) and the circumferential spacing of the discharge ports 102 in the exit band 46ᵃ (Fig. 14) should be slightly uneven, so that firing of successive pairs of propulsion chambers will take place with a slight phase difference. Tests have shown that the intensity of the resultant sound wave is thereby largely reduced.

The leading ends of the successive intake slots 100ᵃ will thus be slightly out of phase and the leading ends of the exhaust ports 102 will be similarly out of phase, so that they will be angularly spaced by the same amount from the closing ends of the associated intake slots.

With three or four pairs of opposite chambers, fired at differences of phase, the individual sound waves of a particular pitch would tend still further to cancel each other out. Moreover, the resulting thrust will become appreciably constant, thus reducing the forces on the aircraft frame.

The radially outward forces on the entire valve member V at the moment of firing are preferably balanced to avoid unequal forces on the valve bands 45 and 46 and hence to avoid any tendency to distort the valve member as a whole. If necessary in order to attain this result, the rear end of the collector and the forward end of the chamber may be reduced in diameter, so as to reduce the pressure on the exposed entrance area of the valve member.

An alternative construction shown in Figs. 17 to 22, has a straight-through passage for the collector 110, chamber 111 and nozzle 112, but does not have the port-opening and port-closing parts of the valve member supported on both sides by other parts of the valve member, as is the structure previously described.

In this alternative construction, the valve member V' (Fig. 18) consists of two flat disc-like ends 115 and 116 having slots 115ᵃ and 116ᵃ which provide chamber opening and closing, these ends being integral with a cylindrical sleeve 117, slotted for lightness at 118. This valve member V' is rotatably supported on rollers 119 (Fig. 20) as previously described.

Each chamber 111 is held in fixed position in the fuselage of the craft C'. Axially extended air vanes 120 (Fig. 22) for cooling the chamber are provided and extend outward, while curved vanes 121 (Figs. 20 and 21) direct air into and out of the recess in which the chamber is located. Extensions 122 (Figs. 20 and 21) of certain vanes 120 serve to hold the chamber 111 in place.

The arrangements of slots 115ᵃ and 116ᵃ of the intervening blank portions (Fig. 18) for the chamber entrance and exit orifices are similar to those for the cylindrical type valve member previously described.

The forward and rearward forces on the valve member V' may be equalized by choosing the right area for the rinsing slots at the nozzle end of the chamber. This is even more important than for the cylindrical type of valve, since, if the forces produced by the explosion are not equalized on the flanges 115 and 116, a resultant forward or rearward force will act on the valve member as a whole, and strong thrust bearings will be necessary.

The valve flanges 115 and 116 (Fig. 19) are each stiffened against high thrust on firing by thickening the flanges inwardly and by providing a fillet at the inner edges. Further, rollers 124 may be provided for the flanged portions of the valve member, in order to avoid rubbing of the flanges against fixed parts of the craft when the chamber pressure rises unusually high.

Either the cylindrical or the disc-type valve member may be made in two separate parts in place of a single member, one part being provided for the chamber inlet and the other for the chamber outlet, with the two parts preferably rotating in opposite directions. Two such discs or flanges 130 and 131 are shown in Fig. 23 and these discs are rotated in opposite directions at the same angular speed by an interposed friction disc 132. This same drive arrangement can be used with cylinder valves as shown in Fig. 3. The two discs or half valves are preferably of equal moments of inertia, so that the net angular momentum remains substantially zero.

Reenforcing rollers, as 124 (Fig. 19), are particularly needed at the outer sides of both of the disc valve members, because of the unbalanced chamber pressure on each when the charge is fired.

Figure 24:
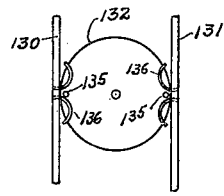
Fig. 24 is a plan view of the modified valve construction.

The friction on the disc 132 should be sufficiently high so that there is no more slippage than can be corrected by the speed equalizing device shown in Figs. 23 and 24. This device comprises a pair of pins 135 mounted at diametrically opposite points on the disc 132 and engaging pairs of springs 136 on the valve discs or flanges 130 and 131. In case any pin arrives too early or too late, it pushes against one spring or the other of the associated pair of springs and this action produces the proper relative positioning or correcting.

Figure 25:
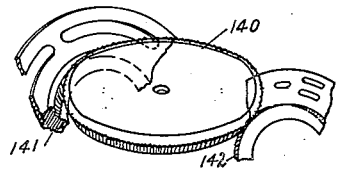
Fig. 25 is a perspective view of a further modified valve construction.

For moderate speeds of rotation, a gear connection may be used in place of the friction disc connection. In Fig. 25 there is shown a bevel gear 140 operating with the valve disc gears 141 and 142.

Figures 26, 27:
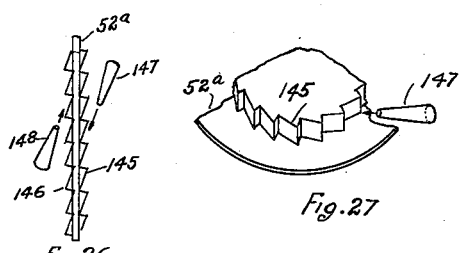
Fig. 26 is a partial plan view of certain turbine valve-rotating means.
Fig. 27 is a partial perspective view thereof.

All of the valve members are preferably driven by air or gas blasts directed from nozzles and acting against buckets or vanes on the valve members. Two such drives may be used, one for starting and one for stopping. In this way any desired speed of rotation may be maintained. Figs. 26 and 27 show a section of a valve flange, as 52ᵃ, with vanes 145 and 146 on the opposite sides, for rotation in opposite directions, and with corresponding driving nozzles 147 and 148.

As already explained, the present resonant and intermittent firing method is of value because it increases the temperature and pressure of the charge that is fired at a moderate craft speed to equal the temperature and pressure at the very great craft speeds at which the athodyd gives good efficiency.

Figure 28:
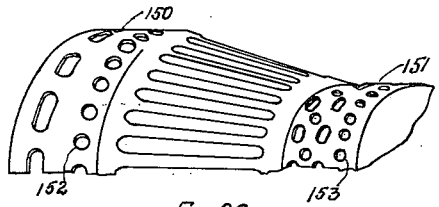
Fig. 28 is a partial perspective view of a further modified rotary valve member.

If the speed of the craft shown in Figs. 1 or 17 becomes very great, it is then possible to utilize effectively a steady flow through the collectors, chambers and nozzles. For this reason, the valve member supporting rollers 57 (Fig. 4) may be made slidable longitudinally, and wide valve bands 150 and 151 (Fig. 28) may be used. These wide bands are to be provided with the usual slots and openings for intermittent operation and also with additional openings 152 and 153 which may be used to uncover all of the chamber entrances as well as all of the nozzle entrances. The valve member is then held fixed with all openings uncovered when operation without valve control is desired.

Figure 29:
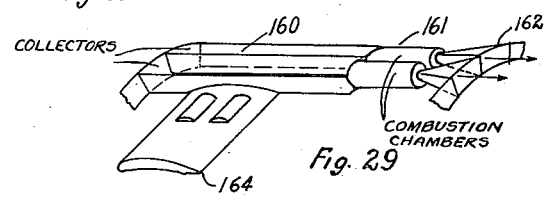
Fig. 29 is a partial perspective view of a modified and close assembly of propulsion units.

In case a large thrust on a small craft is desired, the collectors, chambers and nozzles are to be placed very closely adjacent all over the outer surface of the fuselage. The collectors may then be of square or rectangular sections, as shown at 160 (Fig. 29). The combustion chambers 161 are preferably of circular section in order to provide more strength to withstand internal pressure, and the nozzles 162 extend from circular orifices in the chamber having a minimum circumference in order to reduce frictional loss to square or rectangular outlets. Streamlined wings 164 are attached to the body of the craft.

Figures 30, 31:
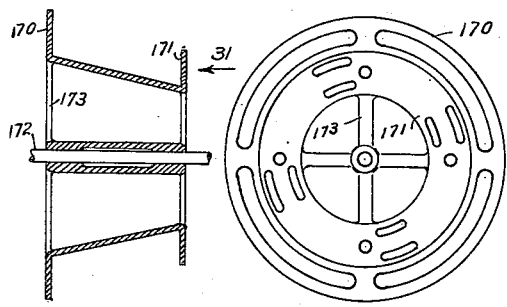
Fig. 30 is a longitudinal sectional elevation of another modified valve member.
Fig. 31 is an end view thereof, looking in the direction of the arrow 31 in Fig. 30.

As an alternative valve construction, rollers may be dispensed with and valve discs or flanges 170 and 171 (Figs. 30 and 31) may be found as parts of a single large wheel turning on a fixed shaft 172. The fuselage parts forward and rearward of the valve wheel are held together rigidly by making that part of the fuselage which is outside of the wheel and combustion chamber of extra strong construction. The wheel can have its spokes 173 so disposed as to make the parts of the valve bands more rigid where the stresses due to firing take place.

The frequency of the air oscillations in the collector will depend on the air speed and density, and this frequency may be maintained at the desired value by varying the extension of the tuning sleeves 75 and also by varying the speed of rotation of the valve member.

After the valve member has been given a suitable speed, and the fuel is turned on, starting may be accomplished by an assisting takeoff means which will give the craft a sufficiently high speed for resonance oscillations to take place within the collector. Alternately, an air jet 180 (Fig. 35, sheet 1) may be used, blowing a spray of highly volatile and powerful fuel from a spray nozzle 181 into the collector sleeve 75 at the required frequency, as determined by opening and closing a valve 184 (Fig. 1). Any usual timing device 185 may be used to open and close the valves 184 in any desired sequence, such as the sequence-operating valve-opening structure shown in the patent to Loftus, No. 978,044. The spark at the spark plug 87 (Fig. 7) is timed to produce strong surges of pressure. After high craft speed has been produced and the reaction of the gases ejected from the chamber and nozzle begins to produce surges within the collector, the starting air blast and fuel spray may be discontinued.

Steering is preferably accomplished by the use of a movable tail piece T (Fig. 1) as set forth in United States Patent No. 2,183,311, issued to Robert H. Goddard December 12, 1939. This tail piece is acted on not only by the slipstream alongside the craft, but also by the blasts from the nozzles 42.

From the foregoing explanation, it will be seen that means have been provided for heating large masses of air momentarily and just preceding ignition within a combustion chamber having a clear entrance during intake and having a closed entrance during the time of firing and of fall of high pressure. The chamber also has a clear outlet during firing and fall of high pressure, and a closed outlet during intake. Means is also provided to scavenge or rinse the combustion chamber just after the fall of high pressure.

Having thus described the invention and certain modifications thereof, the invention is not to be limited to the details herein disclosed, otherwise than as set forth in the claims, but what is claimed is:

1. In an aircraft, a resonance combustion apparatus comprising a plurality of propulsion units mounted in a circular series about the longitudinal axis of said craft and each having an air collector, a combustion chamber and a discharge nozzle all disposed in longitudinal relation but with said combustion chambers substantially offset radially inwardly and out of alignment with respect to both said collectors and said nozzles, and a valve member rotating about said axis and having axially spaced and substantially cylindrical peripheral valve portions provided with ports, one of said peripheral portions passing between the adjacent ends of said collectors and said offset chambers and the other portion passing between the adjacent ends of said offset chambers and said discharge nozzles, and said peripheral valve portions being effective to alternately open and close the entrance and exit ends of said offset combustion chambers, said rotary valve member being shiftable axially and being provided with supplemental radial ports in its peripheral portions which may be radially aligned with all of the entrance and discharge passages of all of said propulsion units to open all of said passages when said valve means is held stationary in a selected position, and said apparatus being thereby rendered more effectively operable at very high speed.

2. In an aircraft, a resonance combustion apparatus comprising a plurality of propulsion units mounted in a peripheral series about the longitudinal axis of said craft and each having an air collector, a combustion chamber and a discharge nozzle all disposed in longitudinal relation but with said combustion chambers offset radially inwardly and out of alignment with both said collectors and said nozzles, a valve member rotating about said axis and having axially spaced and substantially cylindrical peripheral portions provided with ports and effective to alternately open and close the entrance and exit passages to said off-set combustion chambers, and starting means for said resonance apparatus comprising an injector directed toward the open entrance end of each collector, means to supply fuel and air under pressure to each injector, and means to control the flow of fuel to said injectors.

3. In a resonance combustion apparatus, in combination, a plurality of propulsion units arranged in a circular series about a fixed axis, and rotating valve means controlling the delivery of air and fuel and the discharge of combustion gases in all of said propulsion units, said propulsion units being equally spaced circumferentially and said valve means comprising a single continuously rotated valve member having a peripheral series of intake slots and a separate peripheral series of discharge ports, said intake slots being disposed in coacting pairs and with the slots of each pair positioned at the opposite ends of a diameter of said valve member, said discharge ports being similarly disposed in coacting pairs and with the ports of each pair positioned at the opposite ends of a diameter of said valve member, the diameters on which said pairs of coacting intake slots are positioned being slightly unevenly spaced angularly, and the diameters on which said pairs of coacting discharge ports are positioned being correspondingly slightly unevenly spaced angularly, whereby successive pairs of propulsion units are operated with a slight and predetermined phase difference.

4. In a resonance combustion apparatus, in combination, a plurality of propulsion units arranged in a circular series about a fixed axis, a rotating valve member controlling the delivery of air and fuel and the discharge of combustion gases in all of said propulsion units, and counterbalance rings for said valve member which are rotated in the opposite direction and in predetermined speed relation by said member.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 978,044 | Loftus | Dec. 6, 1910 |
| 1,934,944 | McPherson | Nov. 14, 1933 |
| 1,980,266 | Goddard | Nov. 13, 1934 |
| 2,069,938 | Brooke | Feb. 9, 1937 |
| 2,096,184 | Lasley | Oct. 19, 1937 |
| 2,102,559 | Kadenacy | Dec. 14, 1937 |
| 2,176,021 | Grutzner | Oct. 10, 1939 |
| 2,397,357 | Kundig | Mar. 26, 1946 |
| 2,403,388 | Morey et al. | July 2, 1946 |
| 2,403,797 | Hersey | July 9, 1946 |

FOREIGN PATENTS

| Number | Country | Date |
|---|---|---|
| 67,969 | Austria | Feb. 25, 1915 |
| 409,068 | France | Feb. 9, 1910 |
| 412,478 | France | May 3, 1910 |
| 844,442 | France | Apr. 24, 1939 |
| 387,166 | Germany | Dec. 21, 1923 |
| 467,630 | Great Britain | June 21, 1937 |